United States Patent

Lohaus

[11] Patent Number: 5,909,790
[45] Date of Patent: Jun. 8, 1999

[54] CLUTCH PLATE WITH FRICTION DISK SUPPORTED BY IDLE SPRING AND HUB

[75] Inventor: Norbert Lohaus, Schweinfurt, Germany

[73] Assignee: Fichtel & Sachs AG, Schweinfurt, Germany

[21] Appl. No.: 08/895,190

[22] Filed: Jul. 16, 1997

[30] Foreign Application Priority Data

Jul. 25, 1996 [DE] Germany .............. 196 30 040

[51] Int. Cl.⁶ .............. F16D 13/64; F16D 3/14
[52] U.S. Cl. .............. 192/213.22; 192/213.3; 192/70.17; 464/68
[58] Field of Search .............. 192/213.22, 214.1, 192/70.17, 213.2, 213.21, 214, 213.12, 213.11; 464/68

[56] References Cited

U.S. PATENT DOCUMENTS

| | | | |
|---|---|---|---|
| 5,246,398 | 9/1993 | Birk et al. | 192/213.12 X |
| 5,711,407 | 1/1998 | Maier | 192/213.12 X |
| 5,769,199 | 6/1998 | Lohaus | 192/213.21 |

FOREIGN PATENT DOCUMENTS

| | | |
|---|---|---|
| 24 30 160 | 2/1975 | Germany . |
| 34 42 717 | 5/1986 | Germany . |
| 38 13 295 | 11/1988 | Germany . |
| 4 026 765 | 2/1992 | Germany . |
| 2 083 592 | 3/1982 | United Kingdom . |
| 2 167 526 | 5/1986 | United Kingdom . |
| 2 247 299 | 2/1992 | United Kingdom . |
| 2 258 515 | 2/1993 | United Kingdom . |

*Primary Examiner*—Charles A. Marmor
*Assistant Examiner*—Ankur Parekh
*Attorney, Agent, or Firm*—Cohen, Pontani, Lieberman & Pavane

[57] ABSTRACT

A clutch disk with a torsional vibration damper, with an idling system and a load system. The clutch disk including a hub disk mounted with play on a hub via a toothing, cover plates arranged at both sides of the hub disk coaxially thereto, and pre-damper having springs. The hub disk being activatable via a friction arrangement. The friction arrangement has a friction ring which is supported at the hub on one side and at the springs of the pre-damper on the other side.

6 Claims, 2 Drawing Sheets

FIG. 2
FIG. 3
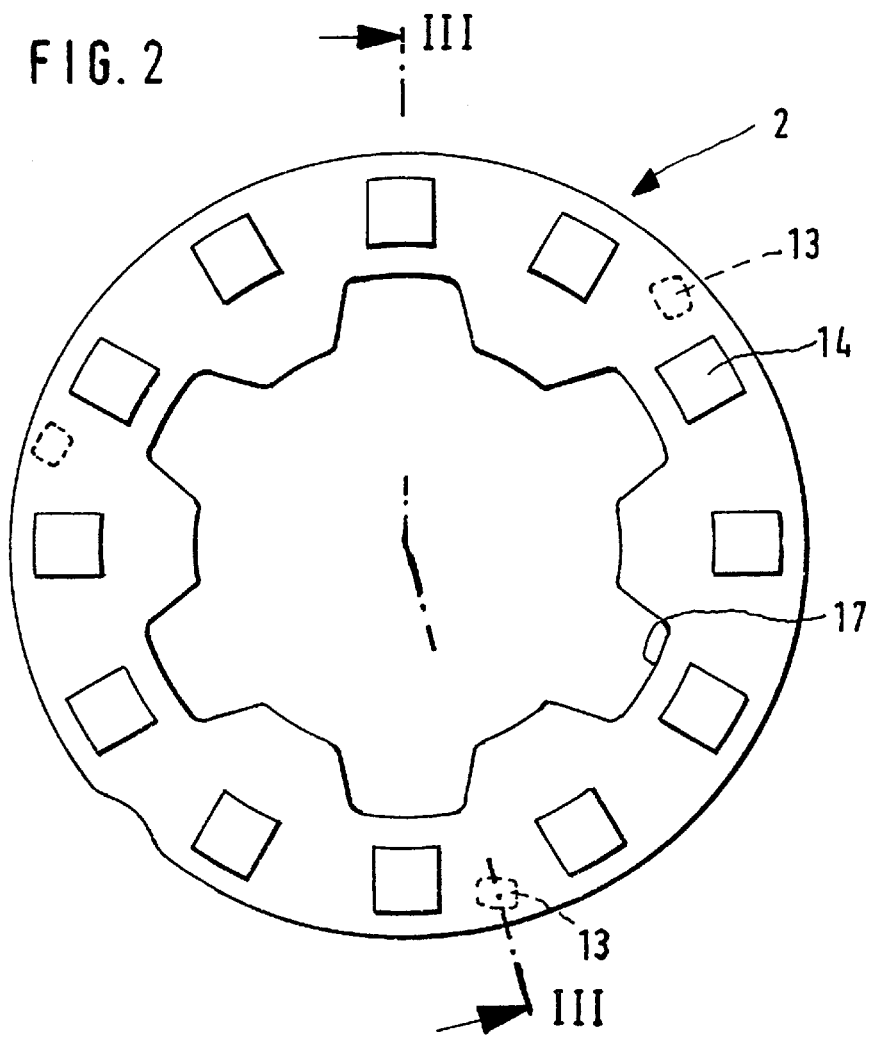
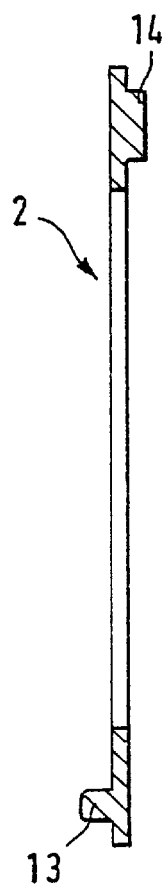

CLUTCH PLATE WITH FRICTION DISK SUPPORTED BY IDLE SPRING AND HUB

BACKGROUND OF THE INVENTION

1. Field of the Invention

The invention relates to a clutch disk with a torsional vibration damper, with an idling system and a load system. A hub disk is mounted with play on a hub via a toothing and cover plates are arranged at both sides coaxially thereto. A friction arrangement is provided which can be activated in the idling state after a partial rotation of the cover plate and hub disk via a pre-damper having springs.

2. Description of the Prior Art

A clutch disk of this kind is known, for example, from German reference DE 40 26 765. This clutch disk is outfitted with an idling system which has a two-stage friction construction in order to optimize the adapting or adjusting possibilities of the idling system.

During cold operation, the torsional vibration damping characteristics, although fundamentally more favorable, must, however, already transmit a considerable idling torque. Therefore, another spring stage is brought into play via the two-stage friction arrangement concurrently with the higher frictional force. In this way, even motor vehicle drives having a quite sensitive response can be favorably adapted. At the same time, the springs of the predamper also provide for an exact return of the friction arrangement when movement is reversed.

The springs of the additional spring stage are arranged in circumferentially enlarged windows of the hub disk. The friction arrangements are formed by a friction segment adjoining the front end of each of the windows. This friction segment fills the axial space between the two cover plates and is acted upon axially by the springs of the load friction device. This offers the advantage that no additional springs are necessary for the additional friction stage and the friction segment can be outfitted with a sufficient friction volume. However, this friction arrangement causes a so-called dragging or delayed friction. Furthermore, a clutch disk of this kind requires a corresponding quantity of friction elements resulting in a correspondingly high cost for storage and assembly.

SUMMARY OF THE INVENTION

Proceeding from this problem, it is an object of the present invention to improve a clutch disk of the generic type.

Pursuant to this object, and others which will become apparent hereafter, one aspect of the present invention resides in a clutch disk with a torsional vibration damper, comprising a hub, a hub disk having a toothing by which the hub disk is mounted on the hub with play, cover plates arranged coaxially at both sides of the hub disk, a predamper having springs, and a friction arrangement activatable in an idling state after a partial rotation of the cover plates and the hub disk via the predamper. The friction arrangement has a friction ring which is supported at the hub on one side and at the springs of the pre-damper on the other side.

As a result of this construction, not only is the number of constructional elements reduced to a single structural component part, but this solution simultaneously offers the advantage of enabling an angularly controlled friction which is dependent on the rotational angle of the friction ring.

The support of the friction ring at the springs of the pre-damper is effected by pins which are arranged on a diameter so as to be spaced at regular intervals and project in the axial direction at one side of the friction ring. The support at the hub is effected with play via an internal toothing. Due to this construction, the friction ring stops at the hub after a first rotational angle and is held back again via the pre-damper springs of the second stage.

When the friction ring is arranged outside the pre-damper, the constructional space is appreciably reduced and assembly is simplified.

On the side located opposite to the above-mentioned pins, the friction ring preferably has a plurality of pins which are likewise arranged on a diameter, spaced at regular intervals and project axially in one direction. These pins can be used for exact positioning of a spring disk which is inserted coaxially between the cover plate and the friction ring and which applies corresponding axial force.

In another embodiment of the invention the hub disk is formed by two hub disk parts (cover plates), and another hub disk is received therebetween. The friction ring is loaded in the axial direction by a spring disk supported against the cover plate. This spring disk is advantageously a wave spring.

In a further embodiment the pins engage in correspondingly arranged windows in the cover plate so that the friction ring can be supported at the springs of the pre-damper.

The hub disk arranged between the cover plates is connected with the hub so as to be fixed with respect to rotation relative thereto without play via an internal toothing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2 is a plan view of the friction ring; and

FIG. 3 is a section along the line III—III in FIG. 2.

DETAILED DESCRIPTION OF THE PREFERRED EMBODIMENTS

Figure 1:
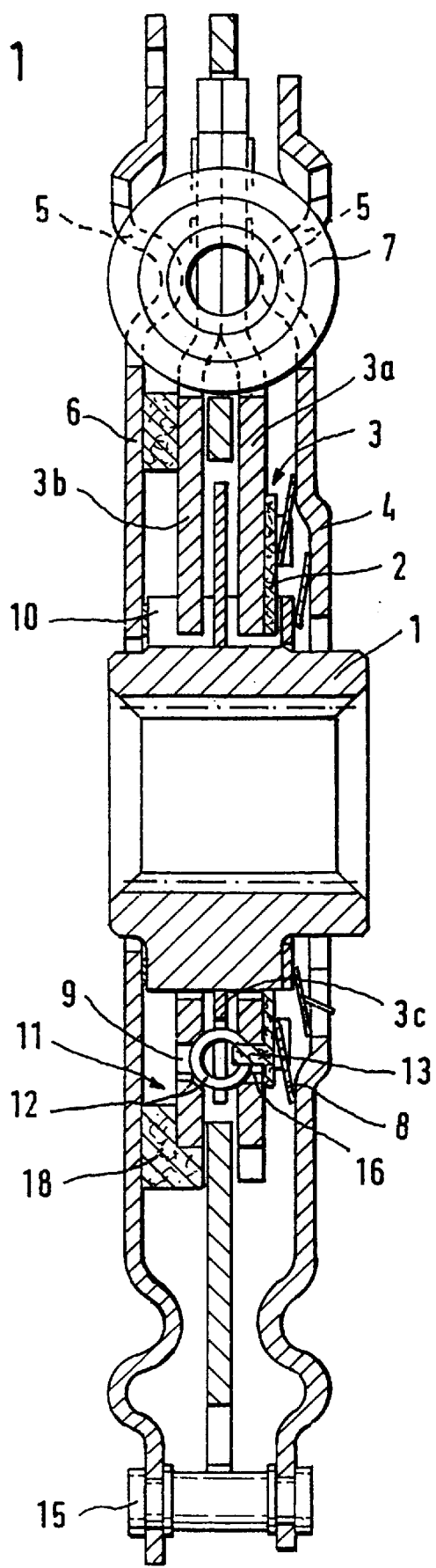
FIG. 1 is a longitudinal section of a clutch disk pursuant to the present invention.

The clutch disk as shown in FIG. 1 comprises a hub 1 which is mountable on a transmission input shaft, not shown in more detail. A hub disk arrangement 3 is connected with the hub 1 via a toothing 10 with play in the rotating direction. The play of the toothing 10 determines the effective range of the idling system. Cover plates 4, 6 are arranged concentrically on both sides of the hub disk arrangement 3. The cover plate 6, which is also referred to as a lining carrier, carries the friction lining, not shown in more detail. Naturally, the cover plate 4 can also function as a lining carrier. The cover plates 4, 6 are connected with one another so as to be fixed with respect to rotation relative to one another via spacer rivets 15. The torque is introduced to the clutch disk via the friction linings, not shown. Torque rods or torsion springs 7 which form the torsion spring suspension for the load system are arranged in the windows 5 in the cover plates 4, 6 and in the hub disk arrangement 3. Torsion springs 12 which form the torsion spring suspension for the idling system are used in windows 9 in cover plates 3a, 3b and in the hub disk 3c. As is shown in FIG. 1, the diameter on which the torsion springs 12 of the pre-damper 11 are arranged is appreciably smaller than the diameter on which the torsion springs 7 of the load system are located. In a known manner, the springs 7, 12 are arranged so as to be evenly spaced over the diameter. The operation of a clutch disk with a pre-damper is explained in detail in the German reference discussed previously. Since it is known in the art there is no need for further discussion herein. The cover plates 3a, 3b are seated on the hub 1 by means of an internal toothing with play in the rotating direction. The hub disk 3c is connected with the hub 1 so as to be fixed with respect to rotation relative to it by way of an internal toothing without play.

A friction ring 2 is arranged between a first cover plate 3a of the cover plates 3a, 3b of the hub disk arrangement 3 and the cover plate 4 of the clutch disk. As is shown in FIGS. 2 and 3, the friction ring 2 has pins 13 which are circumferentially distributed on a diameter and project axially from the ring 2. These pins 13 project into the windows 9 of the first cover plate 3a, specifically to the extent that they project into the springs 12 in the axial direction. A control edge 16 is arranged between the springs 12 and the cover plate 3a. The friction force is applied via a spring plate 8 which is supported on one side at the cover plate 4 and, on the other side, at the friction ring 2. In order to facilitate positioning of the spring plate 8 during assembly, axially projecting pins 14 are provided on the friction ring 2 on the side opposite the pins 13 so as to be evenly distributed on a common diameter. However, the spring plate 8 can also be positioned by other suitable means.

When torque is applied to the cover plate 6 via the friction linings, not shown, this torque being transmitted directly to the cover plate 4 via the spacer rivets 15, no relative movement, and accordingly no friction, occurs between the cover plates 4, 6 and the cover plates 3a, 3b. After a first idling range with low friction in which the friction ring 2 moves with the cover plates 3a, 3b, 4, 6, the friction ring 2 with the internal toothing 17 stops against the hub 1 and produces a friction point relative to the cover plate 3a on one side and a friction point relative to the cover plate 4 on the other side. As the process continues, the cover plates 1a and 3b stop against the hub 1 and switch off the idling damper and accordingly the friction point between the friction ring 2 and the cover plate 3a. When a change in the direction of torque occurs, the friction ring 2 is supported in the idling range by the torsion springs 12 and accordingly again produces a friction point relative to the cover plate 3a on one side and a friction point relative to the cover plate 4 on the other side until the spring moment is smaller than the friction moment of the second friction stage.

The magnitude of play in the toothing of the cover plates 3a, 3b defines the range of the idling damper. The magnitude of play in the toothing of the friction ring 2 defines the range of the second friction moment stage.

The load friction arrangement comprises the spring plate 8 and a friction ring 18. The spring plate 8 is supported internally at the cover plate 4 on one side and at the inside of the cover plate 6 on the other side, via the friction ring 2, the two cover plates 3a, 3b and the friction ring 18. In so doing, the spring plate 8 in the present instance rubs directly against the cover plate 4 and the friction ring 18 rubs against the cover plate 6 or the cover plate 3b. In the present case, the spring plate 8 produces the contact pressure force for the delayed friction arrangement and the load friction arrangement. However, an additional spring disk can be provided for the load friction arrangement which does not act via the friction ring 2, so that the load friction arrangement can be adjusted separately with respect to its frictional force.

The invention is not limited by the embodiments described above which are presented as examples only but can be modified in various ways within the scope of protection defined by the appended patent claims.

I claim:

1. A clutch disk with a torsional vibration damper, comprising:

a hub;

a hub disk having a toothing by which the hub disk is mounted on the hub with play;

cover plates arranged coaxially at both sides of the hub disk;

a pre-damper having springs;

a friction arrangement activatable in an idling state after a partial rotation of the cover plates and the hub disk via the pre-damper, the friction arrangement including a friction ring having one side supported at the hub with rotational play and another side supported at the springs of the pre-damper, the friction ring being arranged axially outside of the pre-damper; and first pins mounted on one side of the friction ring so as to correspond with the springs of the pre-damper and support the friction ring, the first pins being arranged so as to be uniformly spaced in a circumferential direction and project in an axial direction, the friction ring having an internal toothing by which the friction ring is supported on the hub with play.

2. A clutch disk according to claim 1, wherein a plurality of second pins are provided on a side of the friction ring opposite the first pins so as to be uniformly spaced and project axially in one direction.

3. A clutch disk according to claim 1, wherein the hub disk is formed of two hub disk parts with another hub disk received therebetween, the another hub disk being associated with the pre-damper.

4. A clutch disk according to claim 3, wherein one of the hub disk parts has windows arranged so that the first pins project into the windows.

5. A clutch disk according to claim 3, wherein another the hub disk has an inner toothing and is arranged on the hub via the internal toothing without play in a rotating direction.

6. A clutch disk according to claim 1, and further comprising a spring plate supported against the cover plate so as to load the friction ring in an axial direction.

* * * * *